United States Patent [19]

Goetz et al.

[11] Patent Number: 5,155,499
[45] Date of Patent: Oct. 13, 1992

[54] IMAGE-EDGE-PRINTING CONTROLLER

[75] Inventors: Howard V. Goetz, Tigard; Richard A. Springer, Tualatin, both of Oreg.

[73] Assignee: Tektronix, Inc., Beaverton, Oreg.

[21] Appl. No.: 520,010

[22] Filed: May 7, 1990

Related U.S. Application Data

[63] Continuation-in-part of Ser. No. 419,420, Oct. 10, 1989, Pat. No. 4,978,971.

[51] Int. Cl.$^5$ .............................................. B41J 2/01
[52] U.S. Cl. ................................ 346/1.1; 346/33 R; 346/140; 364/519; 400/121
[58] Field of Search ................. 346/1.1, 33 R, 140; 364/519; 400/121, 70

[56] References Cited

U.S. PATENT DOCUMENTS

| | | | |
|---|---|---|---|
| 4,059,183 | 11/1977 | Hoskins | 346/75 X |
| 4,567,570 | 1/1986 | Peer | 364/519 X |
| 4,769,648 | 9/1988 | Kishino | 346/33 |
| 4,978,971 | 12/1990 | Goetz | 346/1.1 |

Primary Examiner—Joseph W. Hartary
Attorney, Agent, or Firm—John D. Winkelman; Edward B. Anderson

[57] ABSTRACT

A print head, formed with spaced linear subheads of jet nozzles, prints all of the lines or image element rows on a print medium such as a sheet of paper by scanning along the face of the sheet. The head is advanced between scans by an equivalent number of lines generally equal to the number of nozzles in the head, whereby all print lines are addressed only once. Apparatus for printing includes the use of pointers in registers to keep track of head structure and location on a print medium for calculating print addresses. A partial page memory is used which wraps around to the beginning from the end. An edge sequence control logic circuit modifies the print data so that nozzles not over the image area do not print. A positive printer carriage position encoder uses an index marker located in the middle of a strip of incremental markers. Sensing of the index marker resets an up/down counter with a value that gives a positive value for all count conditions.

18 Claims, 12 Drawing Sheets

IMAGE-EDGE-PRINTING CONTROLLER

This application is a continuation-in-part of copending U.S. patent application, filed Oct. 10, 1989, having U.S. Pat. Ser. No. 07/419,420 of Goetz et al., entitled "Method and Apparatus for Reformatting Print Data", now U.S. Pat. No. 4,978,971, and assigned to the same assignee as the present application.

FIELD OF THE INVENTION

This invention relates to dot-matrix printing, and in particular, to the controlling of such printing along the edges of an image.

BACKGROUND OF THE INVENTION

The preferred apparatus for and method of practicing the present invention is associated with an ink jet printer wherein a print head scans a print medium, most typically a sheet of paper, by shuttling back and forth across the sheet of paper or by moving continuously along the sheet of paper which is held against a rotating drum. Images are formed by selectively depositing ink deposits or image elements, also referred to as pixels or dots, which are located in a dot-matrix on lines and in columns. The present invention, however, is equally applicable to any printing process wherein a print head travels along parallel lines relative to a print medium to form a desired final image, whether that image be graphic or textual.

Inherent in any such printing system is the requirement that actual printing be limited to the image area. This means that the printing system must be able to determine when each ink jet nozzle orifice or printing element of the print head crosses an image edge, and whether the print head is moving onto or off of the image.

Multiple-orifice print heads pose a difficult challenge for the control electronics when printing over the image edges is considered. Unless all of the orifices are arranged in a single vertical line, it is necessary to selectively "turn on" each jet in succession in the correct pattern as the head moves onto the image from the left and to turn off each jet in the same fashion as the head moves off of the image to the right. In the case of bidirectional head printing, this process must also be reversed as the head moves back across the image from right to left. In a printer made according to the preferred embodiment, there is no mechanism for actually enabling or disabling individual jets; thus turning selected jets on or off must be accomplished by inserting zeros in the serial data stream going to the head. This process must take place quickly and transparently so as not to interfere with the printing process.

The common solution for the above problem is to "pad" the image data with a section of zero or blank data equal in width to the head overscan on each side of the image in the image buffer. Thus, as the image-data elements are read from memory and formatted for the head, jets which would be printing off of the image edges are automatically sent zeros. In the case of the preferred printer, the head is quite wide (>3 inches) and thus very large sections of memory would have to be filled with blanks in order to use this approach. Indeed, for printing of images on standard 8.5×11 inch paper with normal margins, more than half of the entire image buffer memory would end up being filled with zeros. Consequently, the image buffer memory would end up being more than twice as large as would otherwise have been required. Not only is this very wasteful of memory and thus expensive, it could potentially result in a severe throughput penalty due to the time required to write zeros to all those memory locations.

Another approach is to use a look-up table in ROM or software that selectively allows head data to pass using as a table address the number of image elements from image edge. This approach is also expensive. Special circuitry is necessary to calculate the "distance from the image edge" and, more importantly, the ROM required to handle the edge sequences for a head with nearly one hundred jets, as is the case with the preferred embodiment, is very large.

SUMMARY OF THE INVENTION

A printer made according to the present invention provides edge printing control that is relatively inexpensive, does not delay the transmission of print data to the print head, and does not require extensive memory or calculations.

In the general sense this is provided by a method and a controller for controlling the printing by a print head during movement in a predetermined direction across a print medium. The print head has a plurality of printing elements distributed in the direction of print head movement for printing an image formed of image elements printed selectively at image-element locations on an image area of the print medium. The image area has an edge passed by the print head during printing.

The controller comprises a first circuit for generating an image-data element defining a print operation for each printing element. A second circuit generates, for each printing element, a first signal indicating whether the printing element is positioned at an image-element location. A transmitter, responsive to the first signal, transmits data elements to printing elements positioned at image-element locations, and transmits substitute-data elements to printing elements not positioned at image-element locations. The substitute-data elements prevent the printing of image elements.

The preferred embodiment for practicing the invention prints an image formed of image elements printed selectively at image-element locations over a predetermined image area of a print medium. The image-element locations are distributed along lines having centers spaced a predetermined interline distance apart, the ends of which lines define opposite image edges.

A print head has a plurality of printing elements distributed along a path of head movement relative to the print medium for printing an image formed of image elements printed simultaneously and selectively at image-element locations on the image area. The printing elements are separated the width of an integral number of image-element locations from adjacent printing elements along the path of head movement. The print head is moved along the path of head movement cyclically in opposite directions relative to the print medium for positioning the print head with the printing elements aligned with respective image-element locations relative to a print medium for printing the plurality of lines forming the image.

A circuit defines an image-element location corresponding to a selected one of the printing elements associated with each print head position.

A data formatting circuit generates an image-data element defining a print operation and the associated identifying number of each printing element for each position of the print head adjacent to the print medium. A first counter counts the image-element locations addressed by the first printing element to move past an image area edge, and generates an increment signal representative of the movement of the print head the integral number of image-element locations separating the adjacent printing elements, corresponding to the passing of a printing element past the image area edge.

A second counter is responsive to the increment signal for storing the identifying number of the last printing element to move past the image area edge and incrementing, positively or negatively, the stored number by one each time the increment signal is generated. A comparator compares the identifying number associated with each image-data element with the stored number. An edge-identifying circuit generates, during passing of the print head past each image-area edge, an edge signal representative of which edge of the image area the head is passing.

An exclusive OR gate is responsive to the edge signal for generating a decision signal representative of whether the printing element is positioned at an image-element location of the image area. An AND gate is responsive to the decision signal for transmitting the data element to the associated printing element if the printing element is positioned at an image-element location of the image area, and transmitting a substitute element to the associated printing element if the printing element is not positioned at an image-element location of the image area.

It can be seen that such a printer controls printing at the image edges without using extensive memory or calculations. These and other features and advantages of the present invention will become apparent from a reading of the following detailed description of the preferred methods of practicing the invention in association with the accompanying drawings.

DETAILED DESCRIPTION OF THE PREFERRED METHOD AND EMBODIMENT

Figure 1:
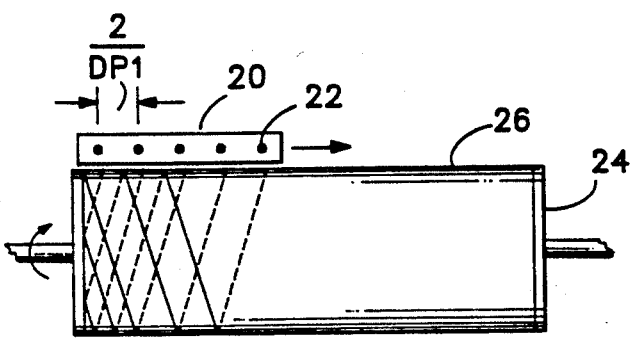
FIG. 1 is a simplified illustration of a drum printer.
Figure 2:
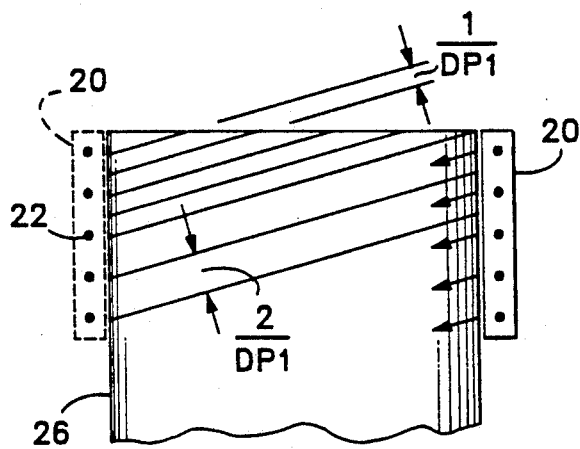
FIG. 2 is a face view of the head and print medium of FIG. 1.
Figure 3:
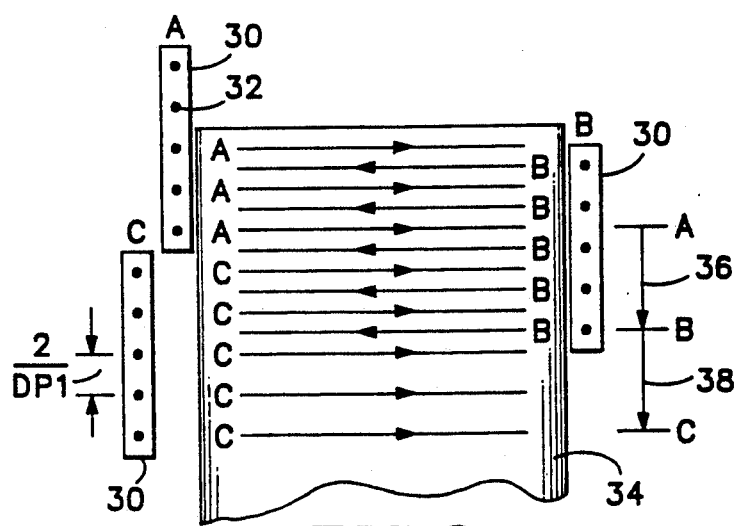
FIG. 3 is a view similar to that of FIG. 2 showing an alternative embodiment.

FIGS. 1-3 disclose printing heads having nozzles spaced a plurality of printed line widths apart with each scan of the head printing lines interlaced with lines printed during the preceding scan.

FIG. 1 shows a simplified design of a printing head 20 having a plurality (five) of nozzles 22 spaced for printing simultaneously a plurality of spaced lines. Head 20 is positioned adjacent a drum 24 having a print medium, such as a sheet of paper 26, mounted on it. As the drum and sheet rotate, the head is moved at a constant velocity longitudinally along the drum so that all lines are printed. During each full revolution, the head advances the equivalent of 5 line spacings. Thus, on each subsequent revolution, the upper lines between lines printed on the prior revolution are printed in addition to new spaced lines, as shown. This head embodiment is also shown in FIG. 3 for printing by scanning back and forth across a planar print medium.

In these figures, one line spacing between the centers of adjacent lines is the inverse of the dot-per-inch density, or 1/DPI, two line spacings is 2/DPI, etc. In FIG. 2, head 20 is shown in dashed lines at the position at the edge of the sheet after completing a series of lines. The head is also shown in solid lines, in the same position on drum 24, ready to begin the next set of lines. It can be seen by the arrows that two lines of the next set of lines are interlaced with the preceding set of lines. All of the preceding lines are printed. Continued drum rotation results in all of the lines on sheet 26 being printed.

A printing system equivalent to that of FIGS. 1 and 2 is shown in FIG. 3. In this embodiment a head 30 with nozzles 32 prints alternate lines on sheet 34. However, rather than sheet 34 being on a drum and rotated, it is moved both longitudinally and laterally relative to head 30. Normally, the head shuttles back and forth across the face of sheet 34 as the sheet is advanced. After each set of lines is printed, head 30 is shifted down the sheet by an amount shown by arrows 36 and 38 which are equal in length to the width of 5 lines of print. Thus, typically head 30 is stopped at the end of each scan pass, the sheet is shifted, and the head is driven across the sheet in a reverse direction.

It can be seen that the embodiment of FIG. 3 provides in effect the same printing operation or method as that of FIGS. 1 and 2. The letters at the top of the respective head positions represent the passes in alphabetical sequence. Corresponding letters are applied to the beginning of lines printed during each pass.

Figure 4:
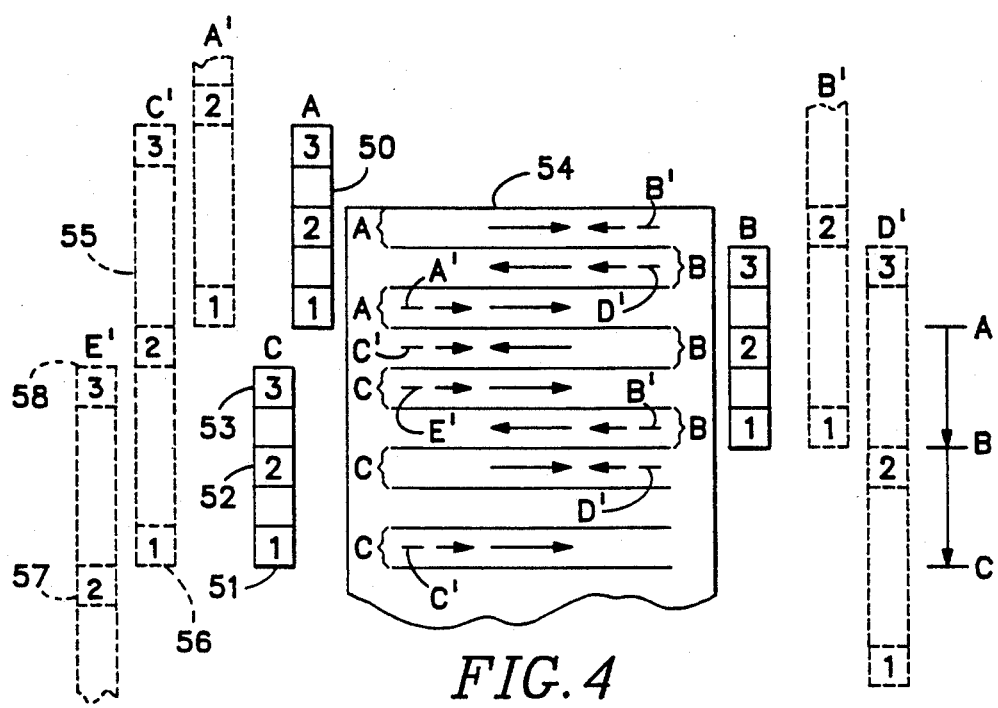
FIG. 4 is a view similar to that of FIG. 3 showing generally yet another head design.

Yet another embodiment for printing is shown in FIG. 4. A head 50 is formed of subheads 51, 52 and 53 (listed as 1, 2 and 3 in the figure). Each subhead prints a set of adjacent lines represented by the bracketed regions on a sheet 54 of a print medium. Again, the letters designate the alphabetical sequence of scans by head 50 across sheet 54. The solid arrows on the sheet indicate the direction of scan for the corresponding region.

The subheads forming head 50 are spaced apart by the same distance as the region scanned by each subhead. The area of sheet 54 printed by subhead 52 during scan B is adjacent areas printed by subhead 51 during scan A and by subhead 53 during scan C to completely fill in the overall area. The head is advanced the equivalent of three subhead regions, between scans.

A second embodiment of this subhead structure is illustrated by head 55 shown in dashed outline, including subheads 56, 57 and 58. The subheads print the same region width as the subheads of head 50. However, these subheads are the equivalent of four subhead widths apart. The corresponding scans are represented by the alphabet labels with a prime, such as A', and the scans are represented by arrows formed with dashed lines within each scan region. Even though the subheads are spaced farther apart, the head advances the same incremental distance relative to the sheet between scans.

Figure 5:
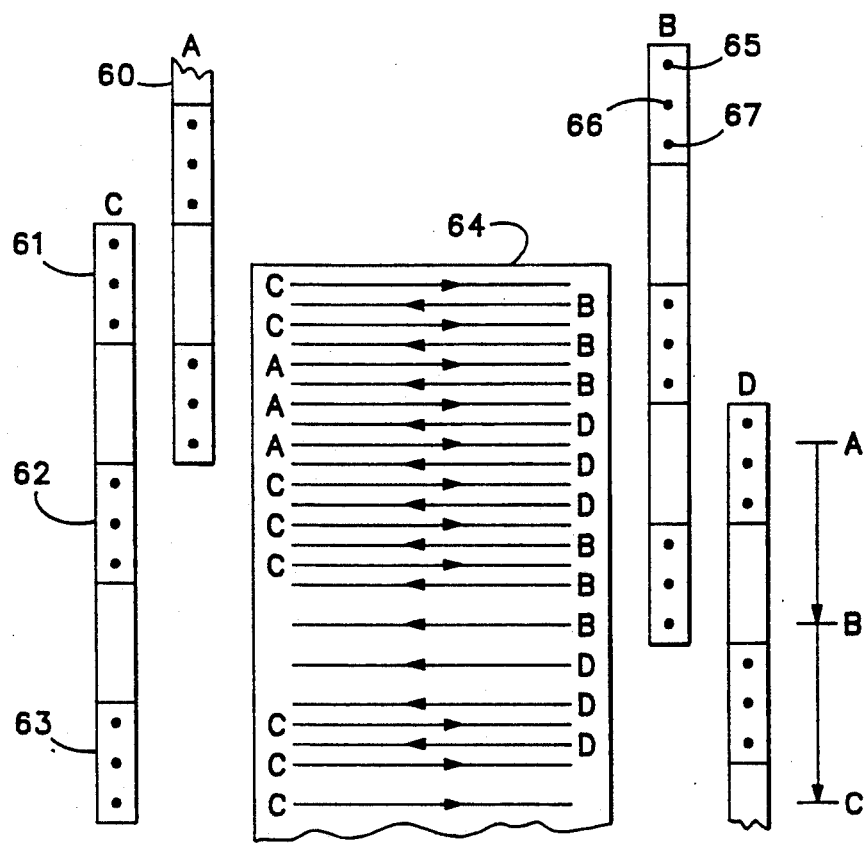
FIG. 5 is a view similar to that of FIG. 4 showing a head design for interlaced printing of lines within bands.

Printing incorporating interlaced line printing in the interwoven band or set printing of FIG. 4 is shown in FIG. 5. A head 60 formed of subheads 61, 62 and 63 is scanned over a sheet 64 of print medium. Each subhead has a series of three nozzles 65, 66 and 67 spaced the equivalent of two lines apart. The subheads are spaced the equivalent of seven lines apart. The head is advanced the equivalent of nine lines between scans, the same distance as the number of nozzles in the head.

Figure 6:
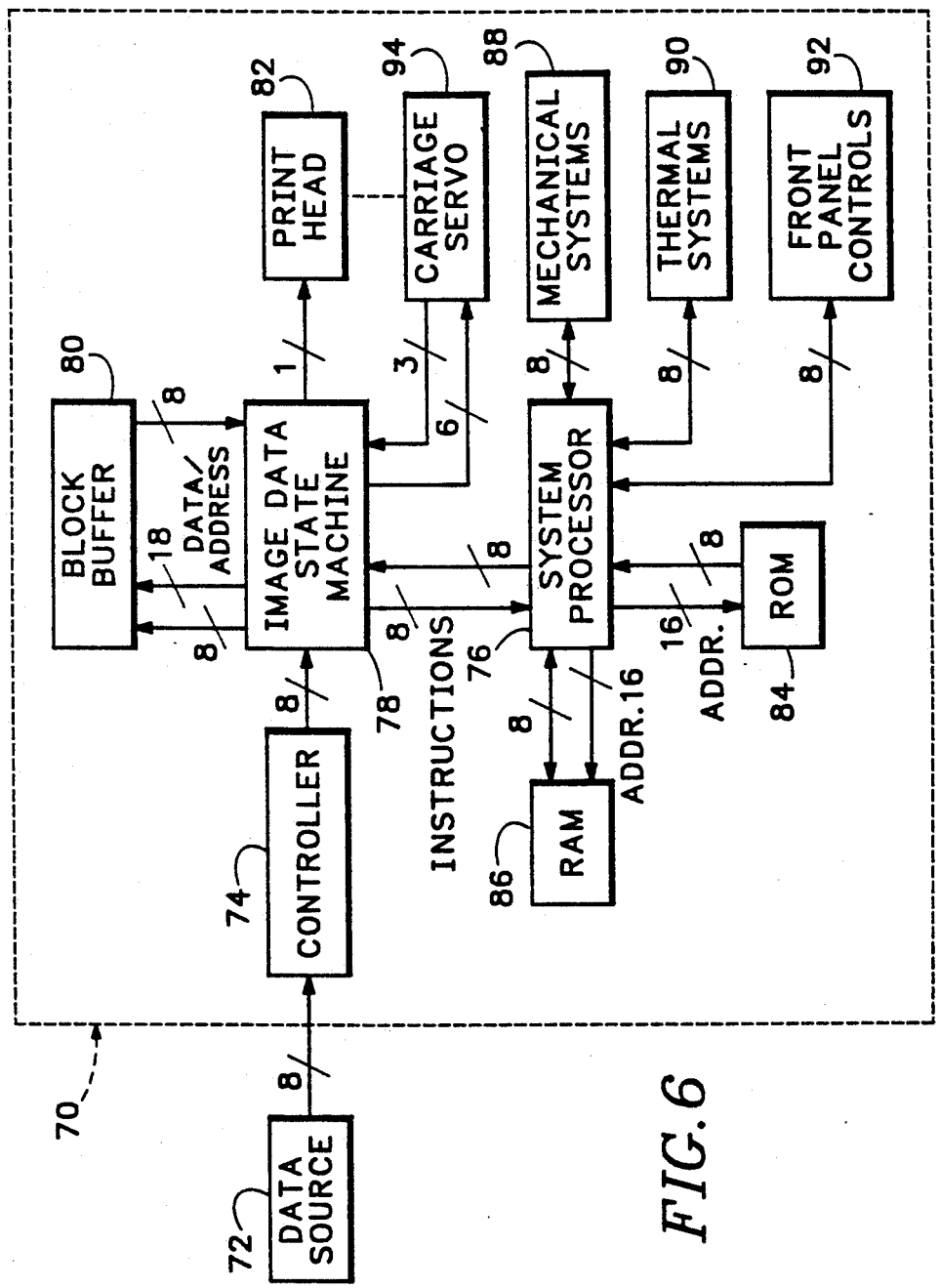
FIG. 6 is a general block diagram illustrating an apparatus made according to the present invention for printing as illustrated in the previous figures.

FIG. 6 is a block diagram of a printer 70 usable to perform the printing described with reference to FIGS. 4 and 5. Printer 70 receives data from a data source 72 at a controller 74. This controller acts as a communication interface with the data source.

From controller 74, the data is input into an image data state machine 78 which writes the data by sequential address in a block buffer (RAM) 80, also referred to as a partial page memory. The incoming data is conventionally in a raster-scan format. It is read out of buffer 80 for printing by a print head 82 in a sequence corresponding to the physical configuration of the print head array.

System processor 76 provides overall control of printer 70. It typically includes an operating program stored in a ROM 84 and retrievably stores information being processed in a RAM 86. The system processor receives dynamic information from the printer mechanical systems 88, thermal systems 90 and front panel controls 92. State machine 78 also exchanges positional information with a print head carriage servo 94 for coordinating data reading with print head position relative to a print medium.

Figure 7:
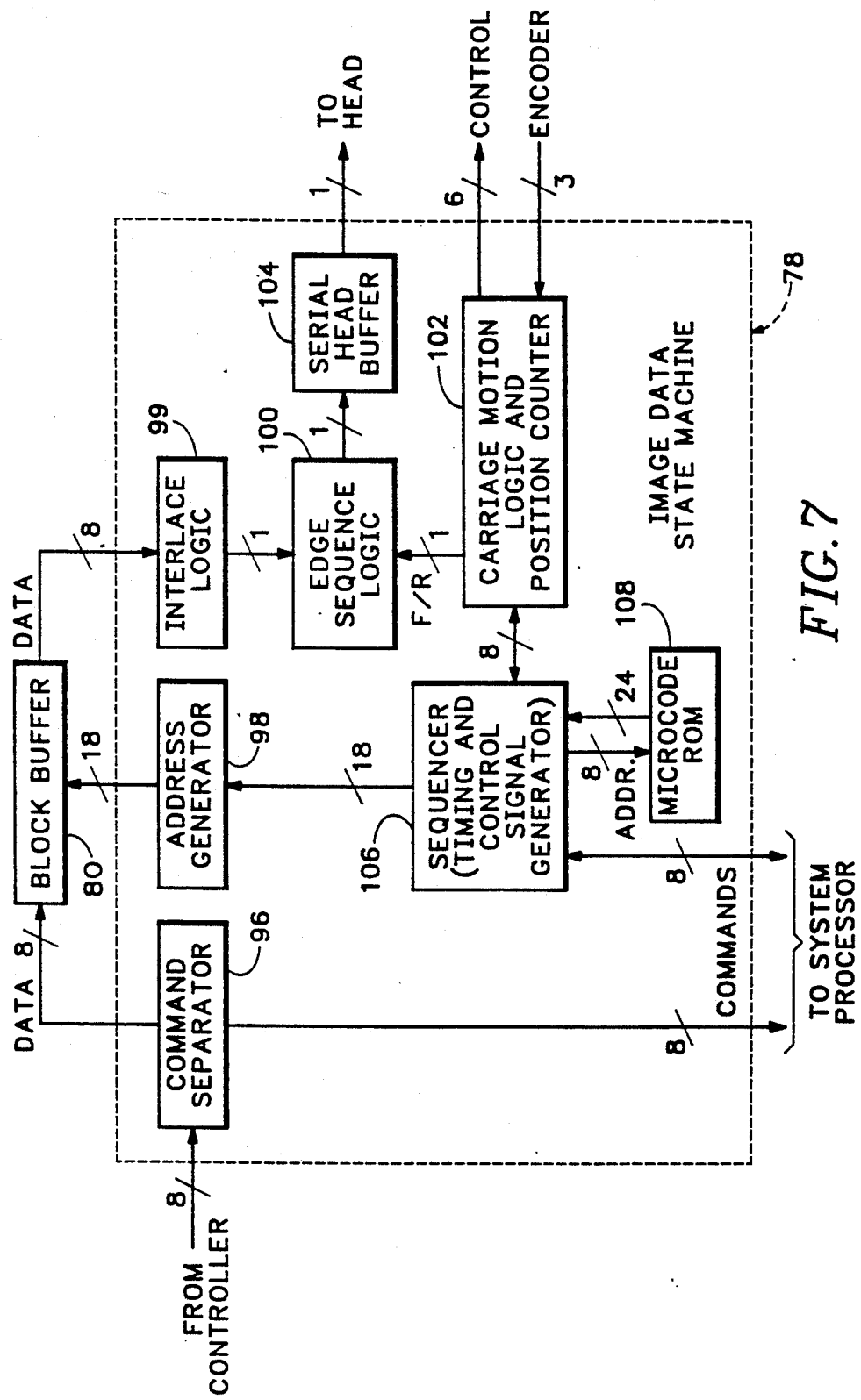
FIG. 7 is a more detailed block diagram of the image data state machine shown in FIG. 6.

FIG. 7 shows in further detail the structure of state machine 78 which controls writing and reading of pixel or other image element data. The information is received in a command separator 96 from controller 74. The command separator identifies the information as either data or system commands. The commands are routed to system processor 76. The data is fed into and out of block buffer 80 at addresses determined by an address generator 98. The data is read out into an interlace logic circuit 99 which functions to select the appropriate bit from each stored 8-bit data word to be used to control whether each jet will print.

The eight bits of data coming from the block buffer contain two 4-bit pixels, each of which has 1 bit for each of the primary colors black, cyan, magenta and yellow. The eight bits of input to circuit 99 consist of seven bits of jet number, one bit of read address, and a mode selection. The seven bits of jet number select which of the four color bits are routed to the one-bit serial output.

Printer nozzle print suppression, which provides printing only on the image region of a print medium, is controlled through an edge sequence logic circuit 100 receiving position and direction (forward/reverse) signals from a position counter circuit 102. This circuit, described in detail with reference to FIGS. 13 and 14, sends control information to the carriage servo circuit and receives position information from an encoder attached to the carriage.

This 1-bit data path continues through the edge sequence logic to a serial head buffer 104. This buffer functions as temporary storage of the 96-bit serial data stream coming from logic circuit 100 prior to sending it to the head.

A sequencer 106, also referred to as a timing and control signal generator, responds to supervisory commands from the system processor under the direction of a microcode stored in a ROM 108. The sequencer controls the generation of read and write addresses in address generator 98 to provide the data reformatting necessary to send the corresponding pixel data to the print head. This is coordinated with the print head carriage position provided through carriage motion logic and position counter circuit 102.

Figure 8:
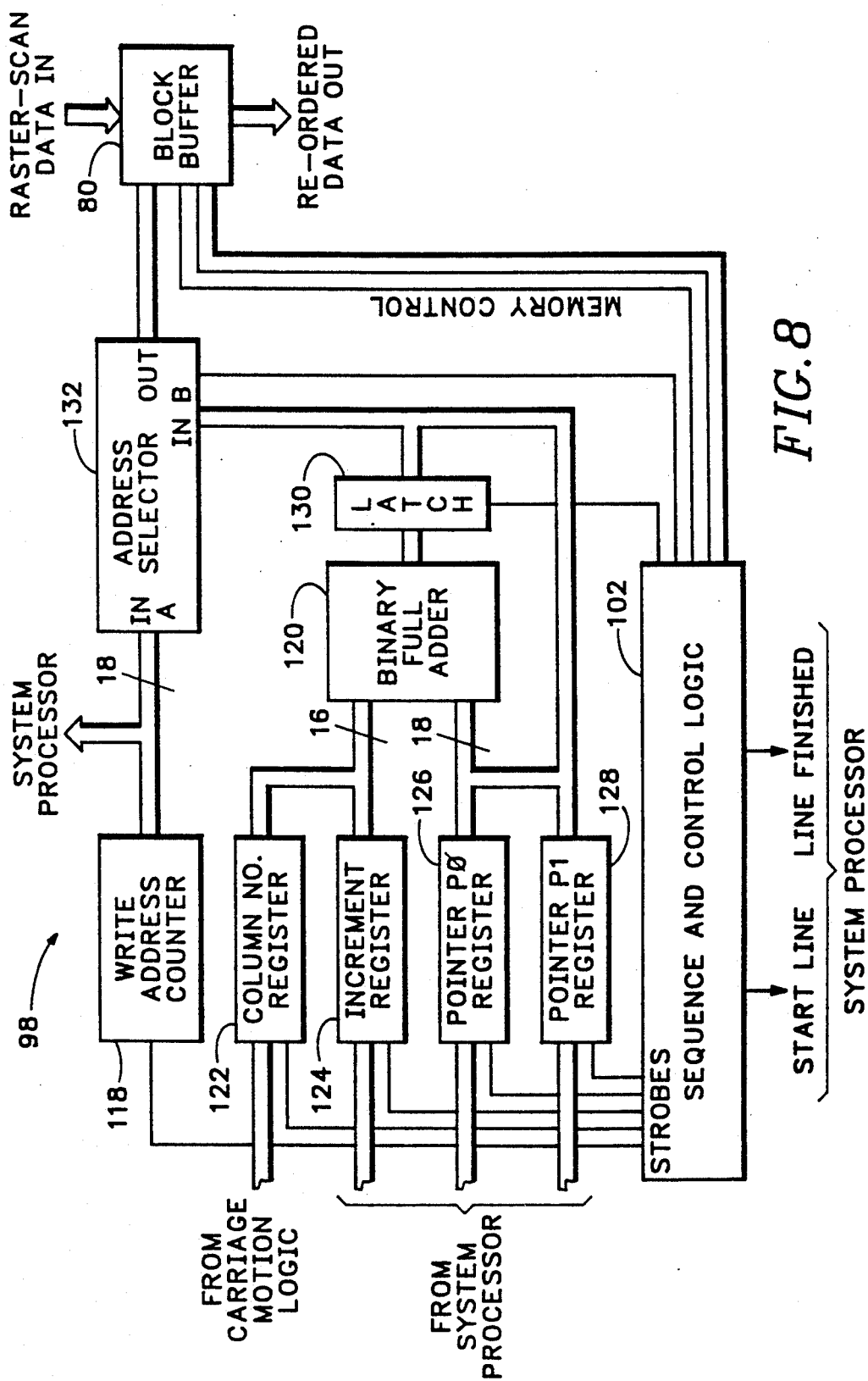
FIG. 8 is a schematic of the address generator and sequencer of FIG. 7.
Figure 9:
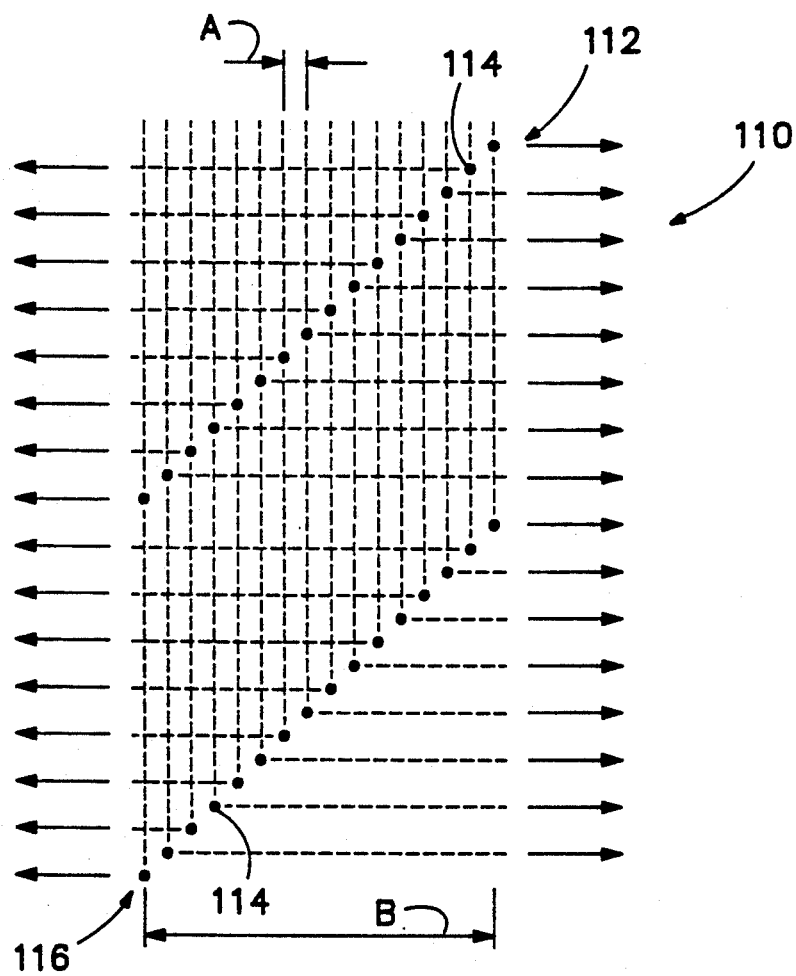
FIG. 9 is a further diagram of a specific ink-jet head array usable with the apparatus of FIG. 6.

FIG. 8 shows in further detail the structure of address generator 98. This embodiment is designed to control printing of a head nozzle array 110, such as is shown in FIG. 9. Array 110 includes a first subhead or set 112 of nozzles 114 wherein each nozzle within the set is offset from each adjacent nozzle a horizontal distance A and a vertical distance of the width of one line. A second set 116 has the same number of nozzles 114 and the same relative positioning of nozzles within the set. However, the top nozzle of the second set is offset from the bottom nozzle of the first set by a horizontal distance B (in pixel spacings or addresses) and a vertical distance of one line. The address offset of the top nozzle of the second set is thus equal to the total number of pixel locations in a line + B from the last nozzle of the first set.

If the distance A is equal to the width of ten pixels or image elements, and a line contains 3000 pixels, then each nozzle is 2990 pixel locations sequentially from the next preceding pixel location within the set. If the head also prints with alternate nozzles when the head scans in one direction and with the remaining nozzles when the head scans in the other direction, then it is only necessary to move the actual head relative to the print sheet on alternate scans. The set interlaced printing illustrated in FIGS. 4 and 5 is provided by increasing the spacing between sets 112 and 114.

Figure 10:
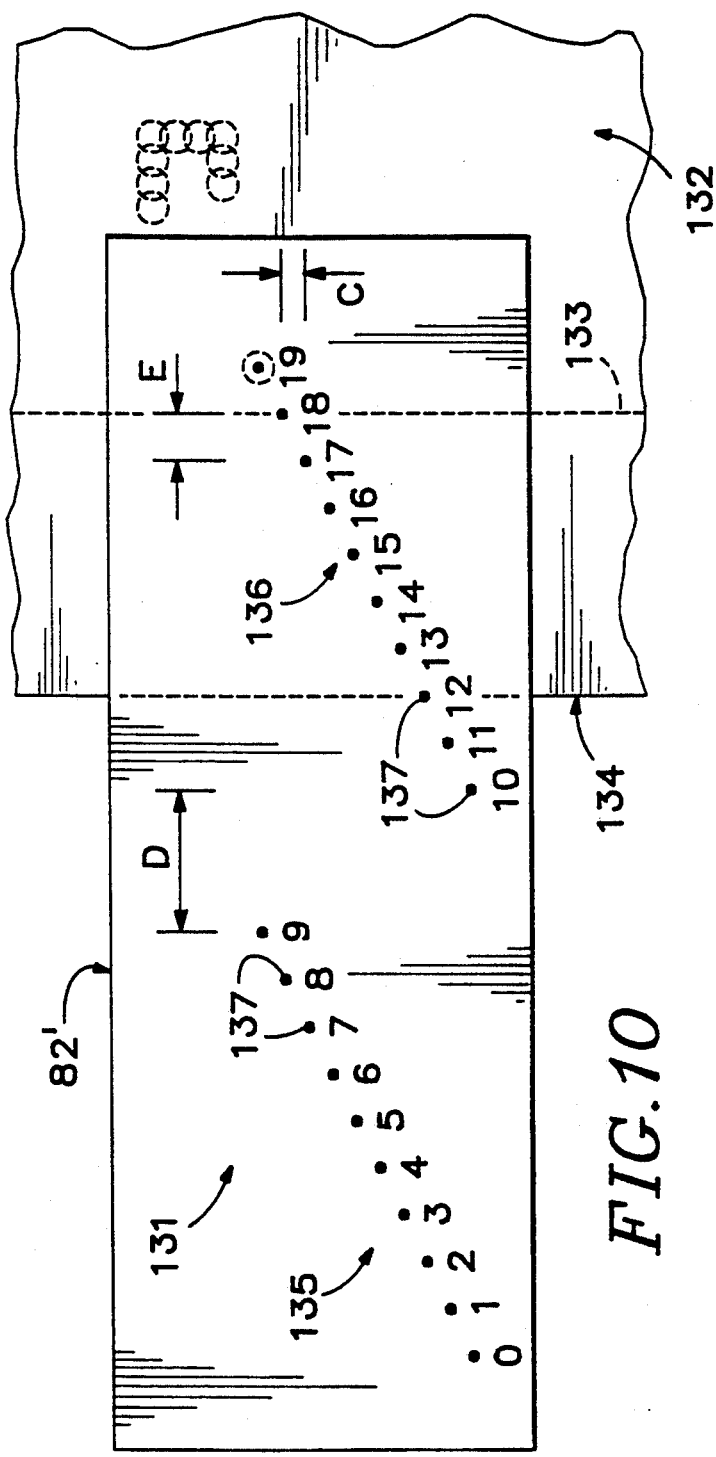
FIG. 10 is an exemplary diagram of a preferred configuration of an ink-jet head array usable with the apparatus of FIG. 6.

In the actual embodiment, each set contains 48 nozzles, and the two sets are spaced horizontally from each other rather than vertically, as shown in FIG. 10. In the preferred configuration of an exemplary head array 131 of a print head 82' shown in FIG. 12, the vertical separation C between ink jet nozzles is appropriate for printing on every line of the image area 132 (bounded by dashed line 133) of a print medium 134. Array 131 includes first and second sets 135 and 136 of nozzles 137. The two sets are separated by a horizontal distance D of 44 pixel locations, and the nozzles within each set are separated by a horizontal distance E of 10 pixel locations.

The nozzles in sets 135 and 136 are numbered 0-9 and 10-19 for illustration purposes. As mentioned, each set contains 48 nozzles, with the nozzles in sets 135 and 136 actually numbered 0-47 and 48-95, respectively.

This embodiment is useful for providing a capability of both black (one subhead) and color (the other subhead) printing. Within the color subhead, three basic colors, such as the three subtractive printing colors of cyan, magenta and yellow, can be provided by multiple sets of three consecutive nozzles within the subhead or by three blocks of nozzles within the subhead, preferably with each block having alternating colors. This then is a form of interlaced printing.

Printer 70 can accommodate either design. With little modification, it will be seen that other designs can also be accommodated. For instance, the designs of FIGS. 4 and 5 are accommodated by adjusting both the increment value within a subhead, and the offset between subheads.

Incoming raster-scan format data is written into block buffer 80. The addresses that govern the memory locations that the incoming data is written into are generated by a simple write address up-counter 118 that is incremented each time that a data byte is written into memory. Thus the pixel data is written into the memory starting at location 0 in the same order in which it comes in from the controller or data source. The system processor can at any time read the current value of the address counter to determine how much data is stored in the memory.

When the block buffer memory contains enough data to allow printing to begin, the data reformatting process begins. From this point on the reformatting process and memory access are under control of the sequence and control logic of sequencer 106. This control is provided by the microprogram stored in ROM 108.

Reformatting the pixel data is accomplished by computing the addresses from which the pixel data is to be read in a particular order, different from the sequential order in which the data was written. This address calculation is performed by a binary full adder 120 using numbers from a column number register 122, an increment register 124, a pointer P0 register 126, and a pointer P1 register 128 in combination with the previous calculated address, stored in a latch 130. An address selector 132 selects between the address in write address counter 118 and latch 130, depending on whether data is being written into or read out of block buffer 80.

The column number register stores a number provided by logic circuit 102 which controls the print head position, and is defined as the number of the image element or pixel location (column) in from the left edge of the image that lies under the right-most nozzle of the first set of nozzles of the print head. The numbers in the other three registers are calculated and stored by the system processor. The number in the increment register remains constant for the entire image, and is related to the image width and print head design. For the particular print head mentioned previously, it is equal to the image width (in pixel locations) - A. In the embodiment described above, it is 3000 pixel locations - 10, or 2990. In the embodiment shown in FIG. 9 where A is equal to the width of one pixel location, the increment value is 2999 if all nozzles are used.

The numbers in the pointer registers are used to relate the current read address to the address at which the data was originally written. When the first printing position of the print head is established for the current pass in an image printing operation, the number in the pointer P0 register is the memory address of the first pixel location in the top line of the portion of the image to be printed. For a split head array as actually used in this embodiment having vertically spaced nozzle sets, the value in the pointer P1 register corresponds to the value in the P0 register minus the horizontal offset B, which is the offset between the two rows of jets in the print head. For the head array shown in FIG. 9, the value in the pointer P1 register corresponds to the line length in pixel locations plus the offset B.

Figure 11A:
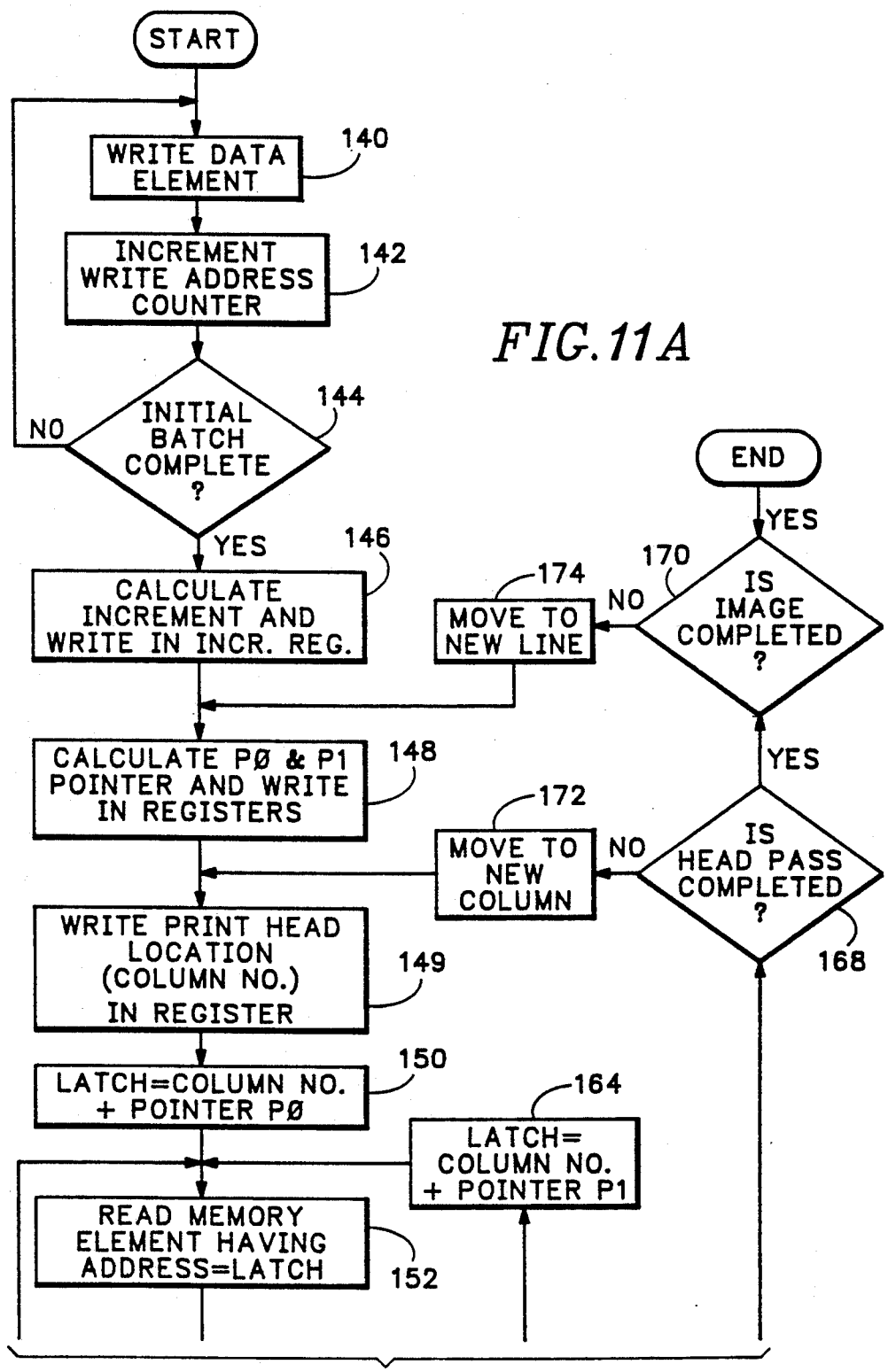
FIGS. 11A and 11B are a flow chart illustrating the data reformatting operation of the apparatus of FIG. 6.
Figure 11B:
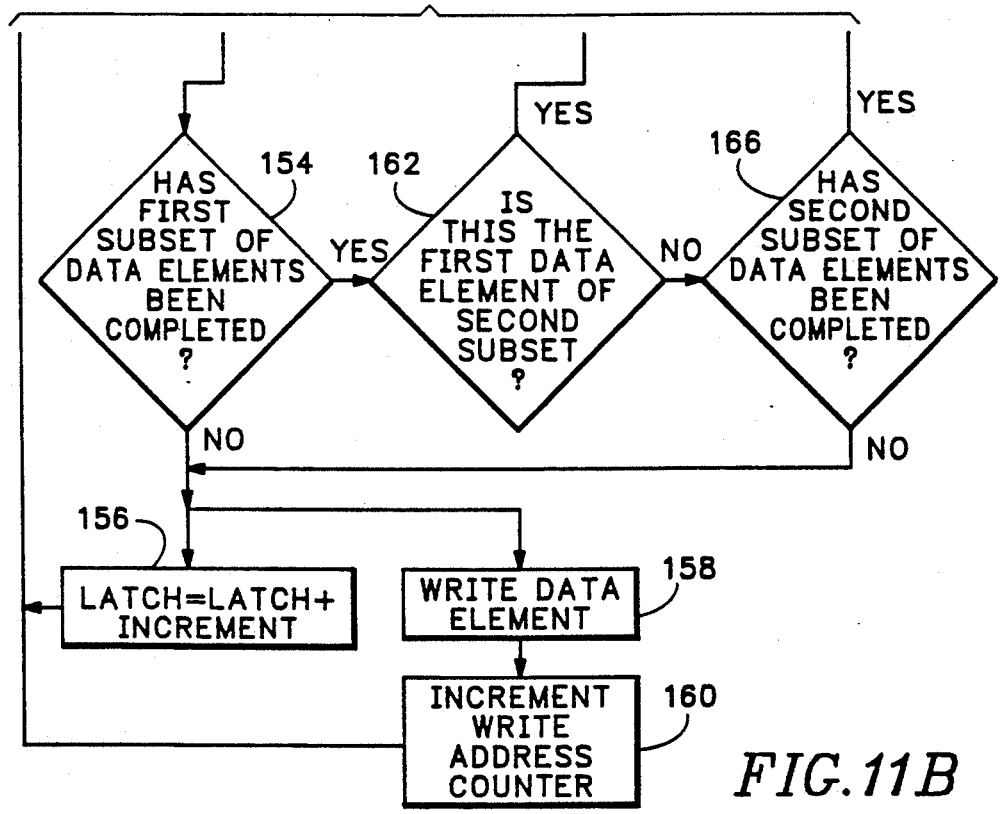

FIG. 11 is a flow chart showing the various steps in printing an image. Incoming data elements are written at block 140. The write address counter is incremented at block 142 and a decision is made at decision block 144 on whether enough data is written to begin printing. If not, then another incoming data element is written at the last incremented address.

If the initial batch of data is written into memory, the increment A is calculated and written into the increment register at block 146. The values for pointers P0 and P1 are calculated and entered into the corresponding registers at block 148. The print head location, as a column number, is entered into the column number register. An initial read address is entered into latch 130 which is equal to the sum of the column number and pointer P0 registers at block 150. The memory element having this address is read from memory at block 152.

If the first set of data elements, as determined at decision block 154, has not been read, then the new read address in latch 130 is set equal to the prior address plus the increment value, at block 156. Concurrent with this process, another incoming data element, if available, is written into memory and the write address counter incremented at blocks 158 and 160. The newly addressed memory data element is then read at block 152 and a determination made again whether the first set of pixel data elements has been read.

If so, a determination is made at decision block 162 as to whether this next data element to be read is the first data element of the second set. If it is, then the address in latch 130 is set equal to the column number plus the value of pointer P1 register, for the actual head embodiment having two vertically spaced nozzle sets. For the embodiment of FIG. 9, the latch is set equal to its prior value plus the offset of pointer P1. The data element at this memory location is then read and the address values incremented and read as with the first set of data elements until the end of the second set is reached. This determination is made at decision block 166.

Once the end of the second set of nozzle positions is reached, a determination as to whether the current pass of the print head is complete is made at block 168. If so, and the image has not been completed, as determined at block 170, then the print head is moved to a new column for the current pass at block 172. The new column number is written in register 122 at block 149 and the process continued until the head pass is completed.

At the end of each head pass a determination is made at block 170 to determine if the image is complete. If not, the head is moved to position for a new set of lines and a new pass at a block 174. The steps previously outlined beginning with setting the P0 and P1 pointers at block 148 is continued until the image is completed, at which point the printing process is terminated.

The design of the memory array, referred to as block buffer 80, used with the above pixel reformatting logic poses some special challenges. It was not considered desirable to make the memory array large enough to store an entire image at one time, due to the very large size and consequent high cost of such a memory. It was therefore necessary to find a way to use a smaller and partial-page memory for temporary storage during the pixel reformatting process. The reformatting must be accomplished without losing the relationship between the write and read addresses, and without complicating the algorithm used to handle the pixel reformatting.

Memory 80 has a size which is less than enough to print an entire page or image. When sufficient data has been entered to fill the memory, it wraps around from the end back to the beginning, together with dynamic read and write pointers. The wrap-around feature of the memory is achieved by generating the write addresses with a simple up-counter that is matched in length to the memory length. For example, if the memory is structured as 256 K of 8-bit words, the associated write counter is configured to overflow at a count of 256 K (262144). Thus, when the last byte of memory is written, the next byte to be written will be at address 0.

To use a memory such as this, it is necessary to keep track of the pointers. Memory addresses have significance only with respect to these pointers. In other words, data is written at locations starting with or relative to a write pointer, and data is read at locations related to or starting with a read pointer. Keeping the correct relationship between the read and written data thus reduces to a problem of keeping the two pointers the correct number of address locations apart in memory. In the preferred embodiment described, this is done by the system processor. The read pointer starts at location 0. External logic allows data to be written to the memory and the write pointer counter 118 is incremented as described with reference to FIG. 11, until the write pointer is a set number of pixel data elements beyond the read pointer. In the preferred embodiment, this set number is 50 lines times the number of pixel locations that the image is wide, such as 3000 pixel locations. Since the print head prints on 48 consecutive lines, this assures enough data elements for a complete pass. This is the value of the initial batch of data elements read into memory as described in the flow chart of FIG. 11.

During the reading and printing cycle, enough new data bytes are written to memory to allow the next head pass also to take place. At the end of the current pass, the system processor checks the value of the write pointer, inputting additional data as required, so that it is again at least the same set distance ahead of the read pointer. Thus, pixel data is always decoded with respect to the read pointer stored in the pointer P0 register 126, and the pixel reformatting logic need not be concerned with absolute memory addresses at all.

By using this partial page memory concept, the minimum size for a memory is much reduced from that for a full page. The minimum size for the memory becomes approximately two times the number of addresses between the read and write pointer. Since two pixel data elements can be stored at each 8-bit address location, this is equivalent to 300 K of storage elements, or 150 K of memory. Thus, the 256 K memory is ample to accommodate this method.

A key requirement for the proper operation of the memory as described is that any logic devices or software operations that can affect the memory address must be arranged so as to overflow all at the same value. Thus, if the memory consists of 256 K words, the memory address counter, the binary full-adder 120, and the software algorithms that compute read pointers must all be designed so as to overflow to 0 when the count reaches 256 K.

Figure 12:
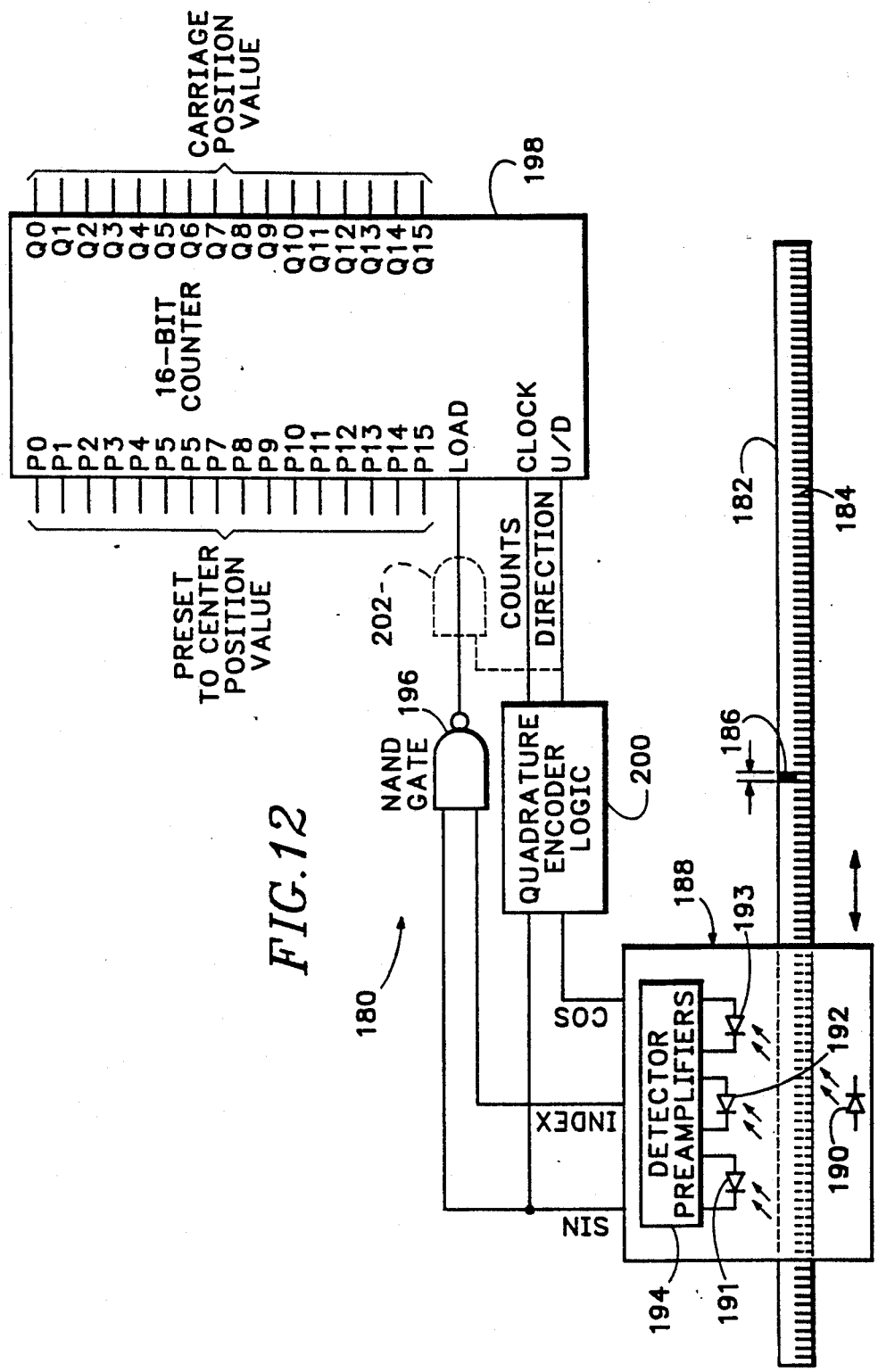
FIG. 12 is a diagram illustrating the structure of a position encoder included in the apparatus of FIG. 6.

FIG. 12 illustrates the structure of an encoder 180. The encoder includes a linear relative position strip 182 having a plurality of incrementally spaced markers 184 positioned along it. Strip 182 is long enough to more than cover the maximum width that a print medium image will have. Strip 182 is attached to a frame which stays fixed relative to the print medium.

An index marker 186 or flag is preferably positioned centrally of the strip to identify this fixed position on the strip. This index marker is used to calibrate the carriage position sensing system in order to correct for any errors in position sensing due to mechanical vibration or electronic noise, and to assure that these variances are not cumulative.

A position marker sensing unit 188 is fixed relative to the print head on the printer carriage and travels along strip 182 so that markers 184 and 186 are sensed. Included is a light emitting diode 190 and corresponding photodiodes 191, 192 and 193. Diodes 191 and 193 are positioned to sense the incremental markers 184 in such a way that they produce signals that are 90° out of phase. Diode 191 is shown to produce a sine wave signal relative to the cosine wave signal of diode 193. Diode 192 senses the occurrence of index marker 186 in a way that is synchronous with the sine wave signal generated by diode 191.

The photodiode signals pass through appropriate amplifiers 194. The sine wave and index signals pass through a NAND gate 196 and the resultant signal is input into the load port of a 16-bit counter 198. The counter has the 16 bits of input preset to a position value that represents the position of index marker 186. The two cosine and sine wave signals also pass through a quadrature encoder logic circuit 200 to obtain a signal identifying the occurrences of markers 184, which is input into the clock port of counter 198. A second signal indicative of the direction of the carriage is fed into the up/down count control port of the counter, so that the count in the counter changes in a manner consistent with the direction of travel of the carriage.

In operation, when the marker sensing unit moves past the index marker, a "high" signal is generated at the "index" output. Because the width of the index mark is equal to the width of the incremental marker spacing, it overlaps two adjacent output clock transitions. By including the NAND gate as shown, only one of these clocks is selected and is sent to the counter. Because of the nature of the 16-bit counter, the data present at the "preset" inputs of the counter will be preset into the counter and will appear at its output on the next rising edge of the clock after the load input goes low. The number present at the preset inputs of the counter can be chosen so that any possible position of the carriage corresponds to a positive count position greater than 0. This greatly simplifies the position control system.

Once the carriage has passed the index marker causing the counter to be preset, it can move forward and back as desired, and the outputs of the counter count up and down accordingly. In the absence of noise, interference, etc., the next time the counter moves past the index marker the value in the counter outputs equals the value that gets preset by the marker, resulting in no net effect caused by the presence of the marker. However, if the counter has accumulated any net position errors for any reason, these errors are removed and the counter is again preset to the proper value upon passing the index marker.

As shown in FIG. 12, index marker 186 is preferably located in the middle of strip 182 which represents the middle of travel of the carriage between the sides of images to be printed. Thus, regardless how narrow an image is printed, so long as it is printed at least at the center of the page of print medium, the index marker will be sensed with every scan of the carriage. Certainly other positions would produce the same result, depending on the minimum image width printed.

An alternative embodiment of the generation of the "load" signal for the counter is shown in dashed lines in FIG. 12. In this embodiment, an AND gate 202 is located between NAND gate 196 and the load port of the counter. The AND gate receives the output of gate 196 as well as the direction signal from quadrature encoder 200. This allows the presetting of the counter to only take place during the reverse direction pass of the carriage, and inhibits it during the forward pass, which may be desirable in some circumstances.

Figure 13:
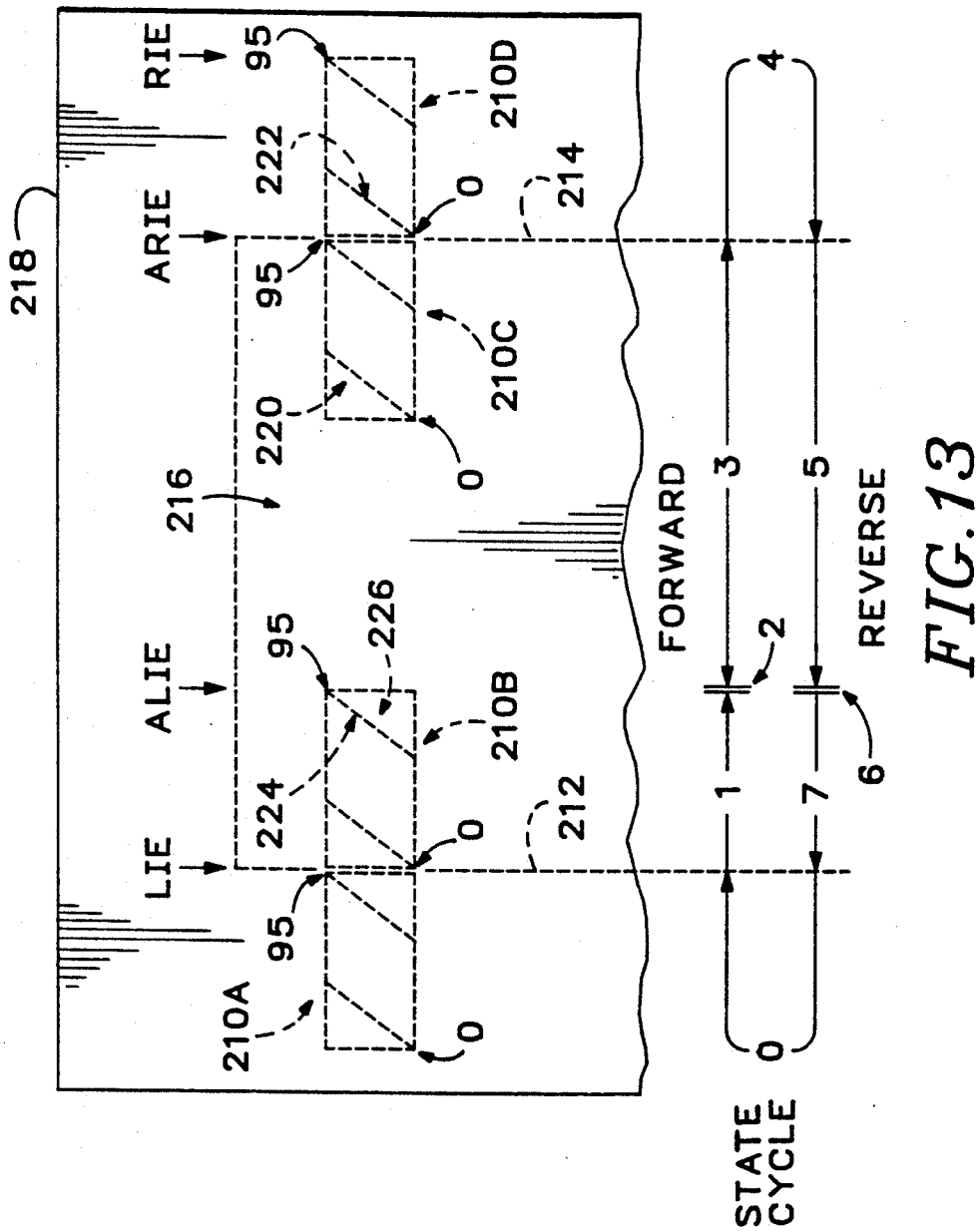
FIG. 13 is a diagram illustrating different printing states during travel of an ink-jet array, like the one shown in FIG. 12, across an image area of a print medium.
Figure 14:
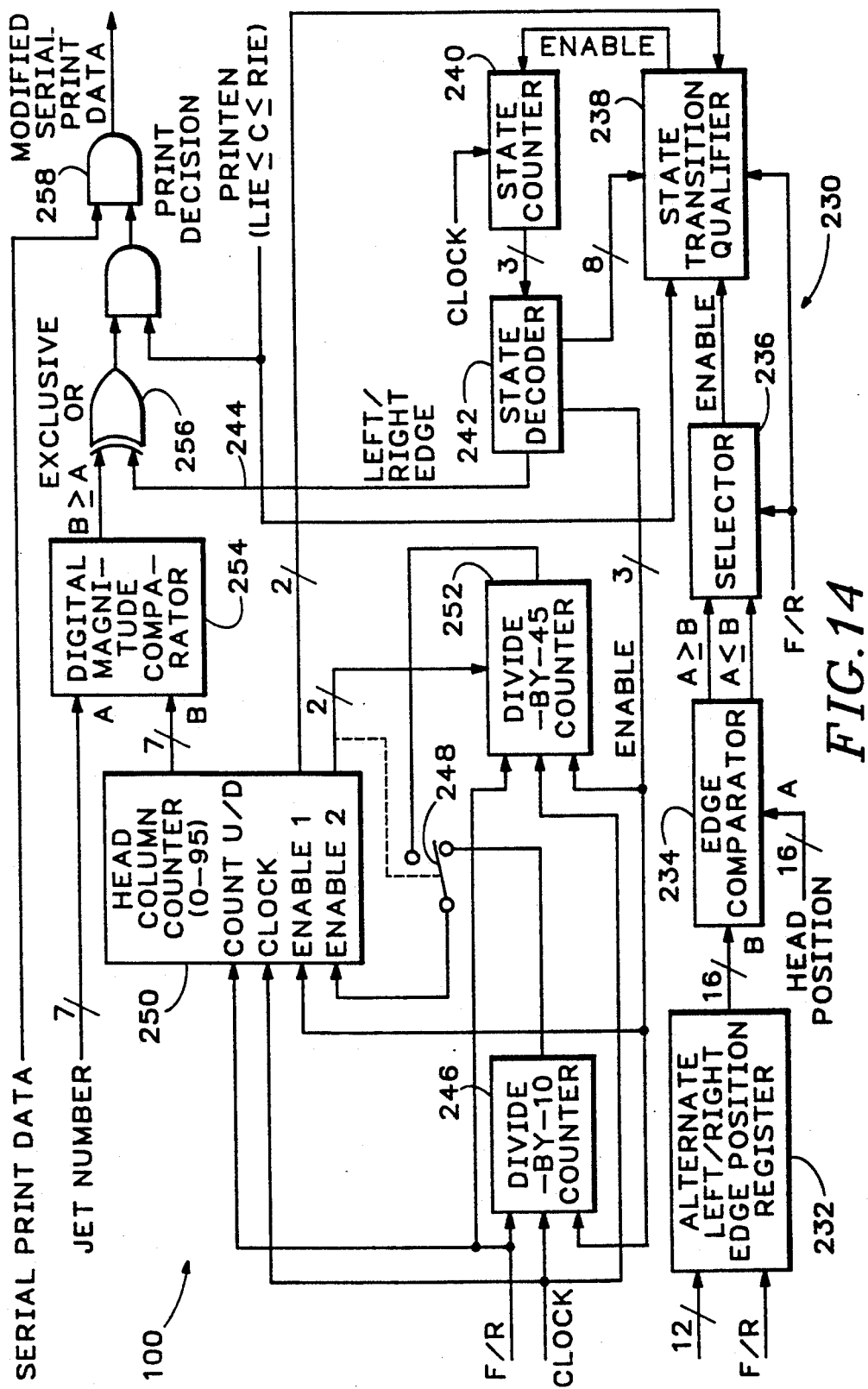
FIG. 14 is a block diagram of the edge sequence logic circuit of FIG. 7, made according to the invention.

Referring now to FIGS. 13 and 14, the structure and operation of edge sequence circuit 100 is discussed. Circuit 100 cycles through seven states as illustrated in FIG. 13. This figure shows the positions of the 96-inkjet nozzle array 210 adjacent to left and right boundaries 212 and 214, respectively, of an image area 216 of print medium 218.

Subarray 220 has 48 nozzles 222, each preferably printing the color black. These nozzles, and therefore the associated jets, have identifying indicators or numbers beginning at 0 at the left-most nozzle and ending at 47 at the upper right nozzle. The nozzles 224 of subarray 226 have numbers ranging from 48 at the lower left to 95 at the upper right. These nozzles form three sets of 16 color-alternating nozzles as described previously. Thus, the nozzles having numbers 0 and 95 are the end nozzles.

As shown by the head arrays in dashed lines, there are four critical positions associated with the two image edges. The position 210A is where nozzle number 95 is at the left image edge 212. This edge is associated with a head column position identified as Left Image Edge, or LIE. To the left of this position, during state 0, none of the nozzles print. At a position identified as Alternate Left Image Edge, or ALIE, nozzle 0 is at left image edge 212. To the right of this position, during states 2 and 6, all of the nozzles print. To the left of this position, during states 1 and 7, only the nozzles to the right of edge 212 print.

Array 210C is positioned with nozzle number 95 at the right image edge 214, identified as a head column value having the variable name Alternate Right Image Edge, or ARIE. All nozzles print to the left of this position during states 2 and 6. To the right of this position, during states 3 and 5, only the nozzles to the left of right image edge 214 print. The farthest position of the head to the right at which any nozzle prints is at the head column number having the value of the Right Image Edge, or RIE. When the print array is to the right of this position, the circuit is in state 4, as shown.

The four array positions 210A-210D represent the four positions of state transition during each direction of scan of the print array. As shown, there are a total of 8 states for a complete cycle scanning from the left to the right (forward) over image area 216 and back (reverse) again.

FIG. 14 shows the structure of edge sequence logic circuit 100, which controls printing through the eight states shown in FIG. 13 by an eight-state state machine, shown generally at 230. The state machine includes a position register 232 which receives the head position values for ALIE and ARIE, as well as a direction signal. These values are compared to the actual head position, received from circuit 102, in a comparator 234. A selector 236, based on the directional signal, determines when the head reaches one of the alternate image edges. If so, an enable signal is input to a state transition qualifier 238, that in turn, in response to the current state, enables a state counter 240 to increment the current state at what is referred to as the next dot clock signal. Qualifier 238 does not function unless a print enable signal, PRNTEN, received from position counter 102, indicates that the print head is over the image. The dot clock signal used here is a pulse signal generated by encoder 180 as the print head carriage moves a distance equal to the width of one pixel or image element.

Counter 240 outputs the state value as a binary number. It is then decoded by a state decoder 242 to produce a signal for each of the eight states for input to qualifier 238. Decoder 242 also generates a signal on a conductor 244 indicating whether the left or right image edge is being passed by the print head array, based on the current state. Also, three enable signals are generated for three counters.

A divide-by-ten counter 246 outputs a pulse every ten dot clock pulses. As has been mentioned, in the horizontal direction the orifices on the head are spaced apart the width of ten pixels, except in the center where there is a large gap the width of 45 pixels. The output of counter 246 passes through a switch 248 to one of two enable inputs of a head column counter 250. Counter 250 is preset at the number of the first nozzle to cross over an edge of the image, and thereafter is incremented, while in the same state, up or down according to the directional signal, on a dot clock pulse when enabled by the two enable inputs. The other enable input is received directly from state decoder 242 which loads head column counter 250 with the appropriate beginning nozzle number whenever the head array begins passing an image edge.

Thus, the head column counter is incremented by one for every ten pixel columns that the head moves on to the image, except at the center of the passage of the head array over an image edge, where the head column counter must increment only after a larger (45) number of pixel columns. This is accomplished by a divide-by-45 counter 252, also enabled by state decoder 242. When the head array reaches the midsection, switch 248 is switched so that the carry signal from the divide-by-45 counter, being properly activated by control input from counter 250, generates a carry signal which is then used to enable head column counter 250 to increment only after the passage of the middle 45 image element or pixel column positions have been passed by the head array. Thus, head column counter 250 keeps track of how many of the nozzles on the head should be allowed to print or not print, depending on the edge and direction of travel. The nozzle count from counter 250 is input to a digital magnitude comparator 254 which compares the array nozzle count with the jet number for each nozzle as data is being formatted for that nozzle. The output of this comparison is a signal that is true (high) whenever the value of the head column counter is less than the number of the nozzle for which data is currently being formatted.

The comparator output goes through an exclusive OR (XOR) gate 256 that also receives as a second input the left/right edge control signal from state decoder 242 on conductor 244. When the signal level on conductor 244 is high, the inverse of the signal output from comparator 254 is output by the XOR gate. Correspondingly, when the signal level on conductor 244 is low, the output of comparator 254 is transmitted through a control AND gate 257 to a print-decision AND gate 258. Gate 257 only passes the signal from XOR gate 256 when the PRNTEN signal is high (true). Gate 258 is in effect a print data enable gate that is also coupled to receive the serial print data which is now formatted and is being directed to the print head through gate 258. Thus, when the output of XOR gate 256 is high, the serial print data will be directly transmitted through gate 258 to the print head. However, when the output of XOR gate 256 is low, only zeroes are output by gate 258, thereby in effect disabling or preventing the printing of the serial print data.

Below is a State Table that shows the various component functions and/or states during transition of edge sequence logic circuit 100 through the eight states. The following is a summary of this operation. Beginning with state 0, the print head moves from the left to the left image edge. When the first nozzle, number 95, crosses left-hand edge 212 of the image, the signal PRNTEN becomes true, which enables the printing process via sequencer 106 and allows the transition to state 1. This then begins the function of circuit 100. Also, state 1 is entered. The value in head column counter 250 is preset at 95. Since the head column counter is set-up as a down counter, the first clock causes it to decrement to 94. The data formatting logic sequentially sends the formatted data for nozzle 0 through 95 through the print data enable gate 258, while at the same time presenting the nozzle number (jet address), in binary form, for each bit of print data to the digital magnitude comparator 254. At this point, resulting from action of comparator 254, XOR gate 256 and AND gate 258, only the print data for jet number 95 will satisfy the condition that the jet number (95) is greater than the head column counter, and thus will be passed, and zeros will be substituted for all other nozzle data. After print or modified data for all 96 jets passes through the gate, the system waits for the next dot clock pulse, signifying that the next pixel or image element column has been reached.

For the next nine clock pulses, the process is exactly the same, with only the data for jet number 95 being passed on to the head. However, upon the tenth clock pulse, the carry output from the divide-by-10 counter will decrement the head column counter to 93. Now the action of the magnitude comparator and exclusive OR gate will be such as to allow printing for jets 95 and 94. This process continues as the head moves ten pixel columns farther to the right. The control logic also acts at the appropriate time to use the divide-by-45 counter to generate the carry signal rather than the divide-by-10 counter when the center gap in the array is moving over the edge of the image. Once the entire head is over the image, the control logic acts to halt further counting of the counters, holding the value in the head column counter at zero. The circuit is in state 2 at this point, which causes the head column counter to be set-up to preset to 95 on the next clock. The next clock pulse presets the head column counter to 95, and transitions the logic to state 3. State 3 is the state in which all jets are allowed to print and the head is entirely on the image. In state 3 the control 244 to the XOR gate becomes 0, which has the interpretation of allowing printing for all jets whose numbers are less-than or equal-to the head column counter value. Since all the numbers 0-95 are ≦95, this means that all jets print.

When the head reaches the right edge of the image, state 4 is entered. In state 4 the head column counter begins to count down, starting with the first clock after C = ARIE. After this clock, the head column counter is equal to 94, and only jets 0-94 are allowed to print. As before, each time the head moves ten columns, as identified by ten dot clock pulses, farther to the right, the head column counter decrements and in essence disables another jet. That is, it is sent a zero instead of print data.

When the head has entirely passed across the right image edge 214, the condition C≦RIE is no longer true and the signal PRNTEN becomes false. This disables further printing. The head then presumably changes direction and begins moving back toward the left. As the head again passes RIE, PRNTEN becomes true and printing is again enabled, initially only for jet 0, since the head column counter will be at 0. Now, with each 10 dotclocks, the head column counter will increment by one, resulting in another jet being in essence enabled, until all jets are again operating. At this point the logic changes to state 5. State 5 is similar to state 3 in that all jets are printing. The head column counter is disabled at a value of 95, and printing is enabled.

When the head reaches the left image edge again, state 6 is entered. This is similar to state 2 in that it only lasts for one clock, and has the only purpose of setting up the head column counter to be preset on the next clock; in this case a preset to 0. The next clock presets the head column counter to 0 and transitions to state 7. In state 7 the control 244 to the XOR becomes true, which has the significance of only allowing jets to print whose numbers are greater than the head column counter. Since the column counter is at 0, only 1-95 can print and in essence jet 0 is disabled. As before, for every 10 dotclocks the head column counter is again incremented by one, and another jet is disabled. This process continues until the head column counter reaches 95, at which time state 0 is entered. On the next clock, the condition C≧LIE also becomes false and thus the signal PRNTEN becomes false. Thus printing is disabled, the head column counter is disabled, and the system waits for the signal PRNTEN to become true again on the next left-to-right pass.

The transition of the components of circuit 100 as shown in FIG. 14, during transition of the print head array 210 through the positions illustrated in FIG. 13, are summarized in the following State Table.

STATE TABLE

| State | C, Head Position | Travel Forward/ Reverse | Left/ Right Edge | XOR Decision, Print When | Print | E, Count | Other Action |
|---|---|---|---|---|---|---|---|
| 0 | C<LIE | F | L | JA>E | DIS | @ 95, DIS | |
| 1 | LIE≦C<ALIE | F | L | JA>E | EN | 95-0 | |
| 2 | C=ALIE | F | L | JA>E | EN | DIS | Preset Count to 95 |
| 3 | ALIE<C<ARIE | F | — | JA≦E | EN | @ 95, |

STATE TABLE-continued

| State | C, Head Position | Travel Forward/ Reverse | Left/ Right Edge | XOR Decision, Print When | Print | E, Count | Other Action |
|---|---|---|---|---|---|---|---|
| 4 | ARIE≦C<RIE | F | R | JA≦E | EN | 95-0 DIS | |
| | C≧RIE | F | R | JA≦E | DIS | @ 0, DIS | |
| | C>RIE | R | R | JA≦E | DIS | @ 0, DIS | |
| | ARIE<C≦RIE | R | R | JA≦E | EN | 0-95 | |
| 5 | ALIE<C≦ARIE | R | — | JA≦E | EN | @ 95, DIS | |
| 6 | C=ALIE | R | L | JA≦E | EN | DIS | Preset Count to 0 |
| 7 | LIE≦C<ALIE | R | L | JA>E | EN | 0-95 | |
| 0 | C<LIE | R | L | JA>E | DIS | @ 95, DIS | |

It should be noted that this same design will allow image edge sequencing for any head design having nozzles arranged in straight lines with not more than two different spacings. By the simple addition of more divide-by-n counters, almost any conceivable head design could be accommodated. In the preferred design, because of the particular embodiment wherein the color nozzle subarray 226, as shown in FIG. 13, is formed of three sets of 16 nozzles, with each set of nozzles alternating in color, the nozzle number actually contains the color of the nozzle, since there is one-to-one correspondence between the jet nozzle number and the color, and it is directly representable in binary form. Other array counts and numbers can also clearly be accommodated in this type of control scheme. Further, while the disclosed control scheme used to modify the serial print data that goes to the print head, it could also be used as a signal to separately enable or disable the jets.

Thus, while the invention has been described with reference to the foregoing preferred method and embodiment, it will be apparent to those skilled in the art that variations may be made without varying from the spirit and scope of the invention as defined in the claims.

We claim:

1. A controller for controlling the printing by a print head during movement in a predetermined direction across a print medium, the print head having a plurality of printing elements distributed in the direction of print head movement for printing an image formed of image elements printed selectively at image-element locations on an image area of the print medium, the image area having an edge passed by the print head, the controller comprising:
   means for generating an image-data element defining a print operation for each printing element;
   means for generating, for each printing element, a first signal indicating whether the printing element is positioned at an image-element location;
   means, coupled to the means for generating an image-data element and responsive to the first signal, for transmitting data elements to printing elements positioned at image-element locations and transmitting substitute-data elements to printing elements not positioned at image-element locations, the substitute-data elements preventing the printing of image elements.

2. A controller according to claim 1 where the printing elements move in a predetermined order past an image edge during printing and the printing elements are assigned identifying indicators, and wherein the means for generating image-data elements further generates the indicator assigned to each printing element associated with a generated image-data element, the controller further comprising:
   means for positioning the print head at consecutive positions during printing, to align the printing elements positioned adjacent to the image area with respective image-element locations at each position of the print head; and
   means for identifying, for each position of the print head spanning an image area edge, the identifying indicator of the last printing element to move past the image area edge;
   the first-signal-generating means further determines, for each data element, whether the identifying indicator of the associated printing element precedes the identifying indicator of the last-printing element.

3. A controller according to claim 2 where at least one printing element is spaced on the print head a first integral number of image-element locations from an adjacent printing element in the predetermined direction of head movement, and wherein the identifying means further comprises first counter means for counting the movement of the print head along consecutive image-element locations and for generating a second signal representative of the cumulative movement of the print head a distance equal to the first integral number of image-element locations, and memory means responsive to the second signal for storing a number representative of the printing element that last moved over the image edge as determined by the cumulative movement of the print head.

4. A controller according to claim 3 where the print head travels sequentially in opposite directions across the print medium and the identifying indicators of the printing elements are numbers ordered sequentially corresponding to the predetermined order of movement of the printing elements across an image area edge, the controller further comprising:
   means for generating a direction signal indicative of the direction of print head movement relative to the print medium;
   the memory means being responsive to the direction signal for incrementing the stored number when the print head is travelling in one direction, and for decrementing the stored number when the print head is travelling in the opposite direction, consistent with the change in the identifying number of the printing element moving past the image edge.

5. A controller according to claim 4 where the image area has opposite edges passed by the print head during movement in each direction of the print head, the controller further comprising means for generating an edge signal representative of the edge being passed by the print head when the print head is passing an edge; the first-signal-generating means being responsive to the edge signal for generating the first signal appropriate for indicating for each direction of print head movement and each identified printing element, relative to the same last-printing-element number, that the printing element is positioned at an image-element location when the print head is spanning one of the image area edges, and that the printing element is not positioned at an image-element location when the print head is spanning the other of the image area edges.

6. A controller according to claim 2 where the identifying indicators are numbers having values consistent with the predetermined order, and wherein the first-signal-generating means compares the values of the identifying numbers of the last-printing element and the printing element associated with each data element, and generates a third signal indicating whether the identifying number of the printing element associated with each data element is less than the identifying number of the last printing element.

7. A controller according to claim 6 where at least a plurality of printing elements are spaced on the print head a first integral number of image-element locations from adjacent printing elements in the predetermined direction of head movement, and wherein the identifying means further comprises first counter means for counting the movement of the print head along consecutive image-element locations and for generating a second signal representative of the cumulative movement of the print head a distance equal to the first integral number of image-element locations, and memory means responsive to the second signal for storing a number representative of the printing element that last moved over the image edge, and changing the stored identifying number to the next sequential identifying number when the second signal indicates the print head has moved far enough for the next printing element to have moved over the image edge.

8. A controller for controlling the printing by a print head during movement in a predetermined direction across a print medium, the print head having a plurality of printing elements distributed in the direction of print head movement for printing an image formed of image elements printed selectively at image-element locations on an image area of the print medium, the image area having an edge passed by the print head whereby the printing elements move in a predetermined order past the image edge during printing and the printing elements are assigned identifying indicators, the controller comprising:

means for generating an image-data element defining a identifying indicator of the printing element;

means for positioning the print head at consecutive positions during printing, to align the printing elements positioned adjacent to the image area with respective image-element locations at each position of the print head;

means for identifying, for each position of the print head spanning an image area edge, the identifying indicator of the last printing element to move past the image area edge; and means for determining, for each data element, whether the identifying indicator of the associated printing element precedes the identifying indicator of the last-printing element, and generating, for each printing element, a first signal indicating whether the printing element is positioned at an image-element location.

9. A printer for printing an image formed of image elements printed selectively at image-element locations over a predetermined image area of a print medium, which image-element locations are distributed along lines having centers spaced a predetermined interline distance apart, the ends of which lines define opposite image edges, the printer comprising:

a print head having a plurality of printing elements distributed along a path of head movement relative to the print medium for printing an image formed of image elements printed simultaneously and selectively at image-element locations on the image area, the printing elements being distributed on the print head with an integral number of image-element locations from adjacent printing elements along the path of head movement;

means for moving the print head along the path of head movement cyclically in opposite directions relative to the print medium for positioning the print head with the printing elements aligned with respective image-element locations relative to a print medium for printing the plurality of lines forming the image;

means defining an image-element location corresponding to each of the printing elements associated with each position of the print head adjacent to the print medium;

data means responsive to the defined image-element locations for generating an image-data element defining a print operation and the associated identifying number of each printing element for each position of the print head adjacent to the print medium;

first counter means for counting the image-element locations addressed by the first printing element to move past an image area edge and for generating an increment signal representative of the movement of the print head the integral number of image-element locations separating the adjacent printing elements, corresponding to the passing of a printing element past the image area edge;

second counter means responsive to the increment signal for storing the identifying number of the last printing element to move past the image area edge and incrementing the stored number by one each time the increment signal is generated;

comparing means for comparing the identifying number associated with each image-data element with the stored number;

means coupled to the defining means for generating, during passing of the print head past each image-area edge, an edge signal representative of which edge of the image area the head is passing;

means coupled to the comparing means and responsive to the edge signal for generating a decision signal representative of whether the printing element is positioned at an image-element location of the image area; and means coupled to the data means and the print head, and responsive to the decision signal for transmitting the data element to the associated printing element if the printing element is positioned at an image-element location of the image area, and transmitting a substitute element to the associated printing element if the printing element is not positioned at an image-element location of the image area.

10. A method for controlling the printing by a print head having a plurality of printing elements distributed in a direction of print head movement for printing an image formed of image elements printed selectively at image-element locations on an image area of a print medium, the image area having an edge passed by the print head, the method comprising the steps of:

moving the print head in the direction of print head movement to a position in which the printing elements span the image area edge;

head generating, for each position of the print adjacent to the print medium, an image-data element associated with and defining a print operation for each printing element;

generating, for each printing element, a first signal indicating whether the printing element is positioned at an image-element location in the image area;

transmitting data elements to printing elements positioned at image-element locations; and transmitting substitute-data elements to printing elements not positioned at image-element locations, the substitute-data elements preventing the printing of image elements.

11. A method according to claim 10 further comprising the steps of:

moving the printing elements in a predetermined order past the image edge during printing;

assigning identifying indicators to the printing elements;

generating, for each generated image-data element, the identifying indicator of the associated printing element;

positioning the print head at consecutive positions to area with respective image-element locations at each position of the print head;

identifying, for each position of the print head spanning an image area edge, the identifying indicator of the last printing element to move past the image area edge; and determining, for each data element, whether the identifying indicator of the associated printing element precedes the identifying indicator of the last-printing element, and thereby, whether the associated printing element is past the image area edge.

12. A method according to claim 11 where at least one printing element is spaced on the print head a first integral number of image-element locations from an adjacent printing element in the predetermined direction of head movement, the method further comprising the steps of:

counting the movement of the print head along consecutive image-element locations;

generating a second signal representative of the cumulative counting of the movement of the print head a distance equal to the first integral number of image-element locations; and storing a number representative of the printing element that last moved over the image edge as determined by the cumulative counting of the movement of the print head.

13. A method according to claim 12 where the identifying indicators of the printing elements are numbers ordered sequentially corresponding to the order of movement of the printing elements across the image area edge, the method further comprising the steps of:

moving the print head, during printing, sequentially in opposite directions past the print medium;

generating a direction signal indicative of the direction of print head movement relative to the print medium;

incrementing the stored number when the print head is moving in one direction, and for decrementing the stored number when the print head is moving in the opposite direction, consistent with the change in the identifying number of the printing element moving past the image edge.

14. A method according to claim 13 where the image area has opposite edges passed by the print head during movement in each direction of the print head, the method further comprising the steps of:

generating an edge signal representative of the edge being passed by the print head when the print head is passing an edge;

generating the first signal appropriate for indicating, for each direction of print head movement and each identified printing element, relative to the same last-printing-element number, that the printing element is positioned at an image-element location when the print head is spanning one of the image area edges, and that the printing element is not positioned at an image-element location when the print head is spanning the other of the image area edges.

15. A method according to claim 11 where the identifying indicators are numbers having values consistent with the predetermined order, the method further comprising the steps of:

comparing the values of the identifying numbers of the last-printing element and the printing element associated with each data element;

generating a third signal indicating whether the identifying number of the printing element associated with each data element is less than the identifying number of the last-printing element.

16. A method according to claim 15 where at least a plurality of printing elements are spaced on the print head a first integral number of image-element locations from adjacent printing elements in the direction of head movement, the method further comprising the steps of:

counting the movement of the print head along consecutive image-element locations;

generating a second signal representative of the cumulative movement of the print head a distance equal to the first integral number of image-element locations;

storing a number representative of the printing element that last moved past the image edge; and changing the stored identifying number to the next sequential identifying number when the second signal indicates the print head has moved far enough for the next printing element to have moved over the image edge.

17. A method for controlling the printing by a print head during movement in a predetermined direction across a print medium, the print head having a plurality of printing elements distributed in the direction of print head movement for printing an image formed of image elements printed selectively at image-element locations on an image area of the print medium, the image area having an edge passed by the print head whereby the printing elements move in a predetermined order past the image edge during printing and the printing elements are assigned identifying indicators, the method comprising the steps of:

generating an image-data element defining a print operation for each printing element, and the assigned identifying indicator of the printing element;

positioning the print head at consecutive positions during printing, to align the printing elements positioned adjacent to the image area with respective image-element locations at each position of the print head;

identifying, for each position of the print head spanning an image area edge, the identifying indicator of the last printing element to move past the image area edge;

determining, for each data element, whether the identifying indicator of the associated printing element precedes the identifying indicator of the last-printing element; and generating, for each printing element, a first signal indicating whether the printing element is positioned at an image-element location.

18. A method for printing an image formed of image elements printed selectively at image-element locations over a predetermined image area of a print medium, which image-element locations are distributed along lines having centers spaced a predetermined interline distance apart, the ends of which lines define opposite image edges, using a print head having a plurality of printing elements distributed along a path of head movement relative to the print medium for printing an image formed of image elements printed simultaneously and selectively at image-element locations on the image area, the printing elements being distributed on the print head with an integral number of image-element locations from adjacent printing elements along the path of head movement, the method comprising the steps of:

moving the print head along the path of head movement cyclically in opposite directions relative to the print medium;

during movement of the print head, positioning the print head with the printing elements aligned with respective image-element locations relative to a print medium;

defining, for each print head position, an image-element location corresponding to each of the printing elements associated with each position of the print head adjacent to the print medium;

generating an image-data element defining a print operation and an associated number identifying each printing element associated with each defined image-element location for each position of the print head adjacent the print medium;

counting the image-element locations addressed by the first printing element to move past an image area edge;

generating an increment signal representative of the movement of the print head the integral number of image-element locations separating the adjacent printing elements, corresponding to the passing of a printing element past the image area edge;

storing the identifying number of the last printing element to move past the image area edge;

incrementing the stored number by one each time the increment signal is generated;

comparing the identifying number associated with each image-data element with the stored number;

generating, during passing of the print head past each of the image area the head is passing;

generating a decision signal representative of whether the printing element is positioned at an image-element location of the image area; and transmitting the data element to the associated printing element if the printing element is positioned at an image-element location of the image area, and transmitting a substitute element to the associated printing element if the printing element is not positioned at an image-element location of the image area.

* * * * *

UNITED STATES PATENT AND TRADEMARK OFFICE
CERTIFICATE OF CORRECTION

PATENT NO. : 5,155,499

DATED : October 13, 1992

INVENTOR(S) : Howard V. Goetz, Richard A. Springer

It is certified that error appears in the above-identified patent and that said Letters Patent is hereby corrected as shown below:

Claim 8, col. 17, line 59, "defining a identifying indicator..." should read "defining a print operation for each printing element, and the assigned identifying indicator...".

Claim 9, col. 18, line 62, paragraph reading "means coupled to the comparing means and responsive to" should include paragraph which follows it so that it reads "means coupled to the comparing means and responsive to the edge signal for generating a decision signal representative of whether the printing element is positioned at an image-element location of the image area; and".

Claim 10, col. 19, line 18, "head generating, for each position of the print adjacent..." should read "generating, for each position of the print head adjacent...".

Claim 11, col. 19, line 42, "positions to area with..." should read "positions to align the printing elements positioned adjacent to the image area with...".

UNITED STATES PATENT AND TRADEMARK OFFICE
CERTIFICATE OF CORRECTION

PATENT NO. : 5,155,499
DATED : October 13, 1992
INVENTOR(S) : Howard V. Goetz, Richard A. Springer It is certified that error appears in the above-indentified patent and that said Letters Patent is hereby corrected as shown below:

Claim 18, col. 22, line 31, "past each of the..." should read "past each image-area edge, an edge signal representative of which edge of the...".

Signed and Sealed this

Fifth Day of October, 1993

*Attest:*

BRUCE LEHMAN

*Attesting Officer*    *Commissioner of Patents and Trademarks*